United States Patent [19]
Brownell

[11] 4,034,948
[45] July 12, 1977

[54] VEHICLE SEAT STRUCTURE

[75] Inventor: Roy D. Brownell, Aurora, Ill.

[73] Assignee: Caterpillar Tractor Co., Peoria, Ill.

[21] Appl. No.: 637,603

[22] Filed: Dec. 4, 1975

[51] Int. Cl.[2] .................... A47C 1/026; A47C 3/34
[52] U.S. Cl. ............................ 248/372; 248/396; 248/399; 248/423
[58] Field of Search .......... 248/371, 372, 377, 396, 248/157, 393, 394, 397, 398, 399, 375, 421, 423; 297/325, 345

[56] References Cited

U.S. PATENT DOCUMENTS

| 2,134,135 | 10/1938 | Lefevre | 248/396 |
| 2,161,367 | 6/1939 | McGregor et al. | 248/394 |
| 2,949,153 | 8/1960 | Hickman | 155/55 |
| 3,218,020 | 11/1965 | Rhodes | 248/401 |
| 3,685,780 | 8/1972 | Stannebein | 248/399 |
| 3,788,697 | 1/1974 | Barton et al. | 248/399 |
| 3,853,295 | 12/1974 | Christin | 248/396 |
| 3,910,543 | 10/1975 | Fourrey et al. | 248/396 |

FOREIGN PATENT DOCUMENTS 1,265,340   5/1960   France ................ 248/423

Primary Examiner—Robert A. Hafer
Attorney, Agent, or Firm—Phillips, Moore, Weissenberger, Lempio & Majestic

[57] ABSTRACT

A vehicle seat structure comprises a seat pivotally connected to swing link means which are in turn pivotally connected to the base by substantially parallel links to allow the vehicle seat to be both raised and lowered or tilted with respect to the base. A height select pin and a tilt select pin are normally restrained within notches in respective height and tilt position members to fix thereby a given height and tilt attitude of the seat. An actuating bar controlled by a control lever acts to disengage either the height select or tilt select pin to permit the pin to be seated in a different notch, thereby enabling seat position to be varied. Compression springs act, for both tilt and height seat position variations, to provide means whereby the weight of the seat operator can be used to adjust seat position.

13 Claims, 4 Drawing Figures

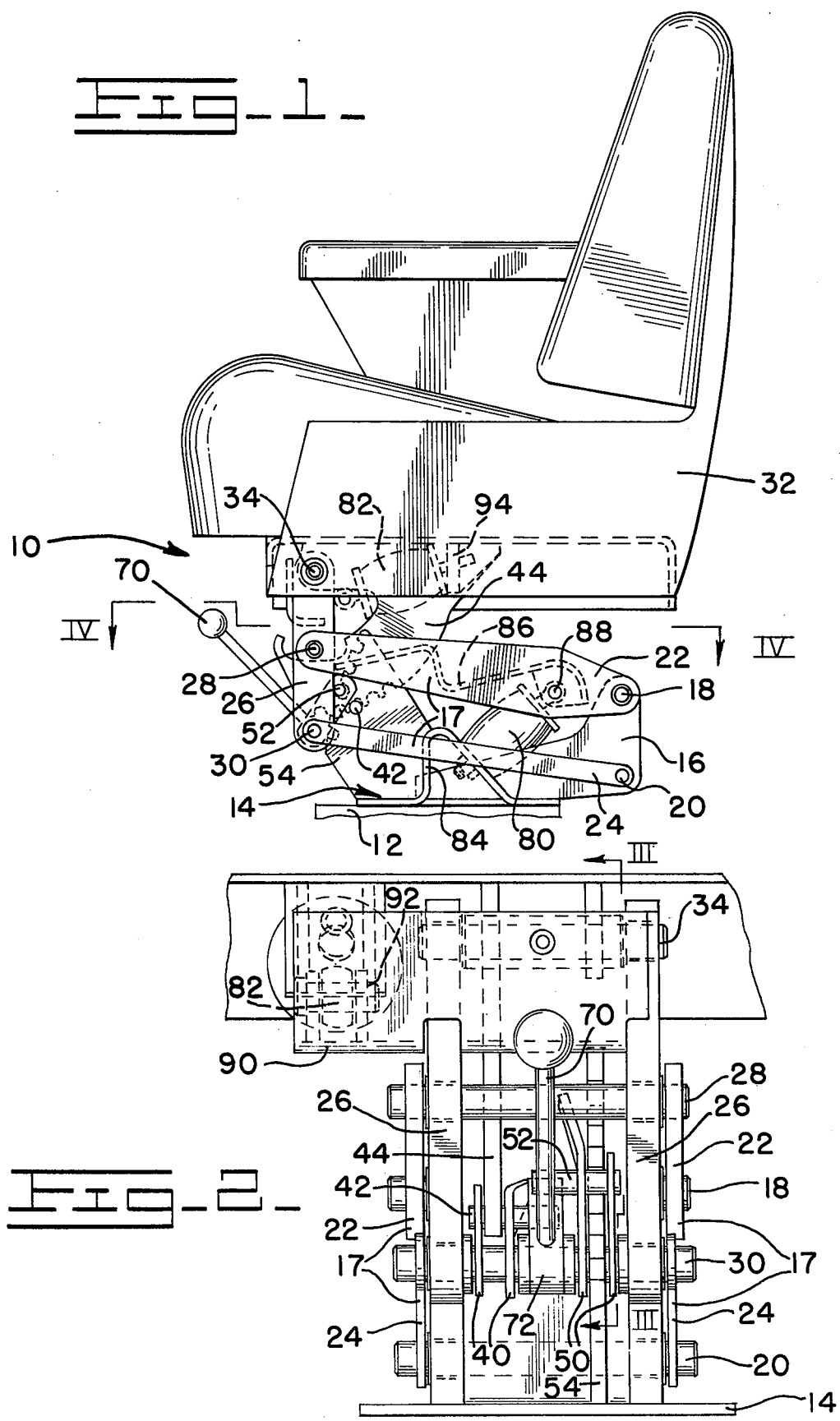

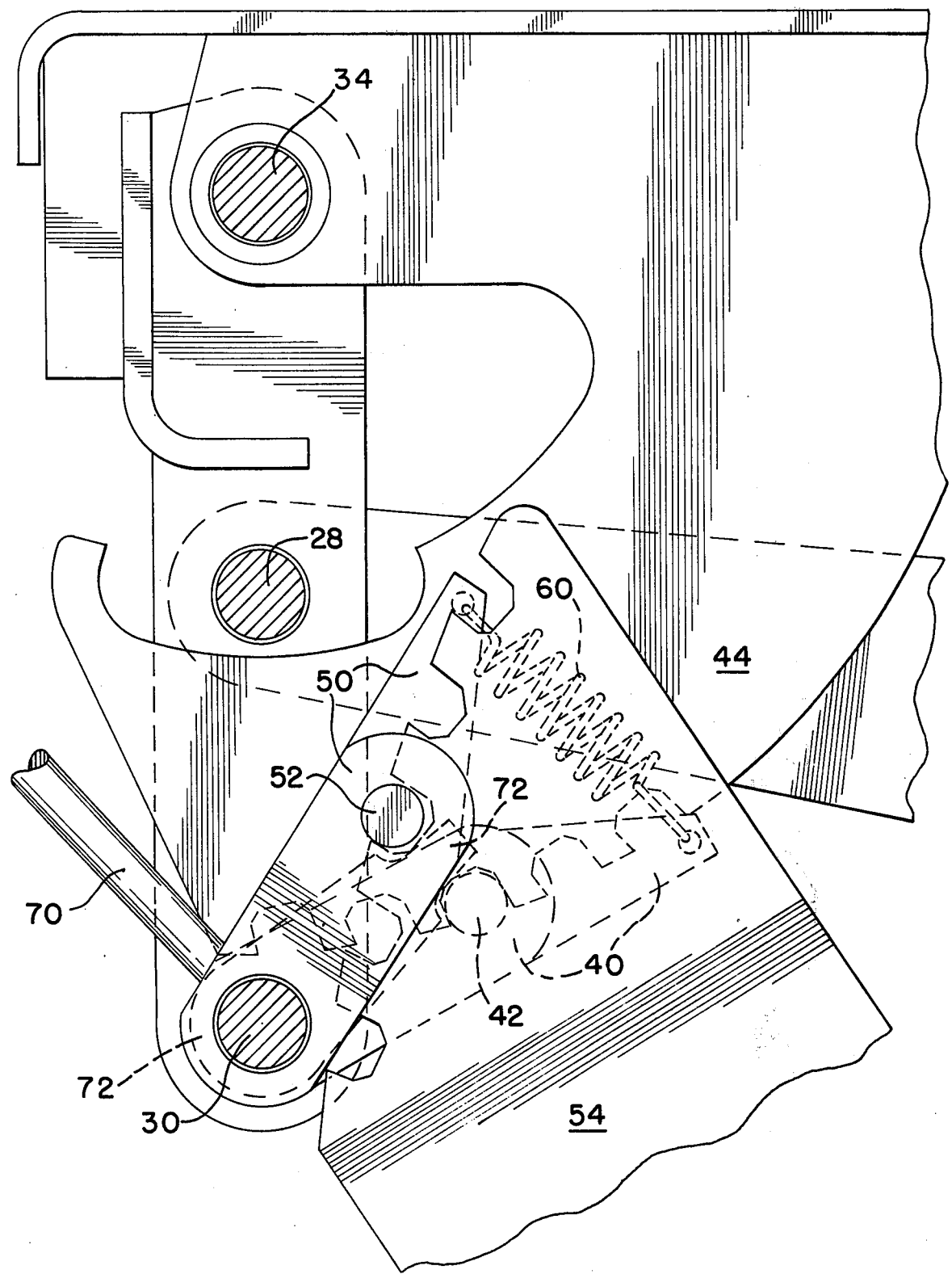

VEHICLE SEAT STRUCTURE

BACKGROUND OF THE INVENTION

This invention relates to a vehicle seat structure, and more particularly, to a means for varying the height and tilt of a seat in an easy and simple way. Such a structure offers greater operator comfort, an important consideration in vehicles designed to be operated in rough terrain.

Conventional seat designs, especially in off-high-way construction vehicles, tend to operate inadequately due to the excessive weight of the seat assembly, such weight caused in part by the seat being designed to give greater seat stability in rough terrain. Also, height and tilt adjustment linkages in past designs have tended to be complex and as a result prone to failure, or tend to lack the stability required to provide operator comfort and safety. Of general interest are U.S. Pat. Nos. 3,218,020; 2,949,153; and 3,788,697. However, none of these cited patents anticipate applicant's invention.

Summary of the Invention

In accordance with the above discussion, an object of this invention is to provide an easy and simple means for varying the height and tilt of a seat requiring only a single lever for operation.

Another object of this invention is to provide a height and tilt adjustment system that diminishes seat weight problems by allowing the operator to vary the height and tilt of the seat merely by shifting his weight therein.

A further object of this invention is to provide a height and tilt adjustment system whose linkages are such that the seat has greater stability than conventional seat designs.

Other objects and advantages of the present invention will become more apparent upon reference to the accompanying drawings and the following description.

BRIEF DESCRIPTION OF THE DRAWINGS

FIG. 1 is a cross-sectional view of the seat embodying the principles of the present invention;

FIG. 2 is a rear view of the seat of the present invention;

FIG. 3 is an enlarged sectional view taken along the line III—III of FIG. 2.

DESCRIPTION OF THE PREFERRED EMBODIMENT

Figure 4:
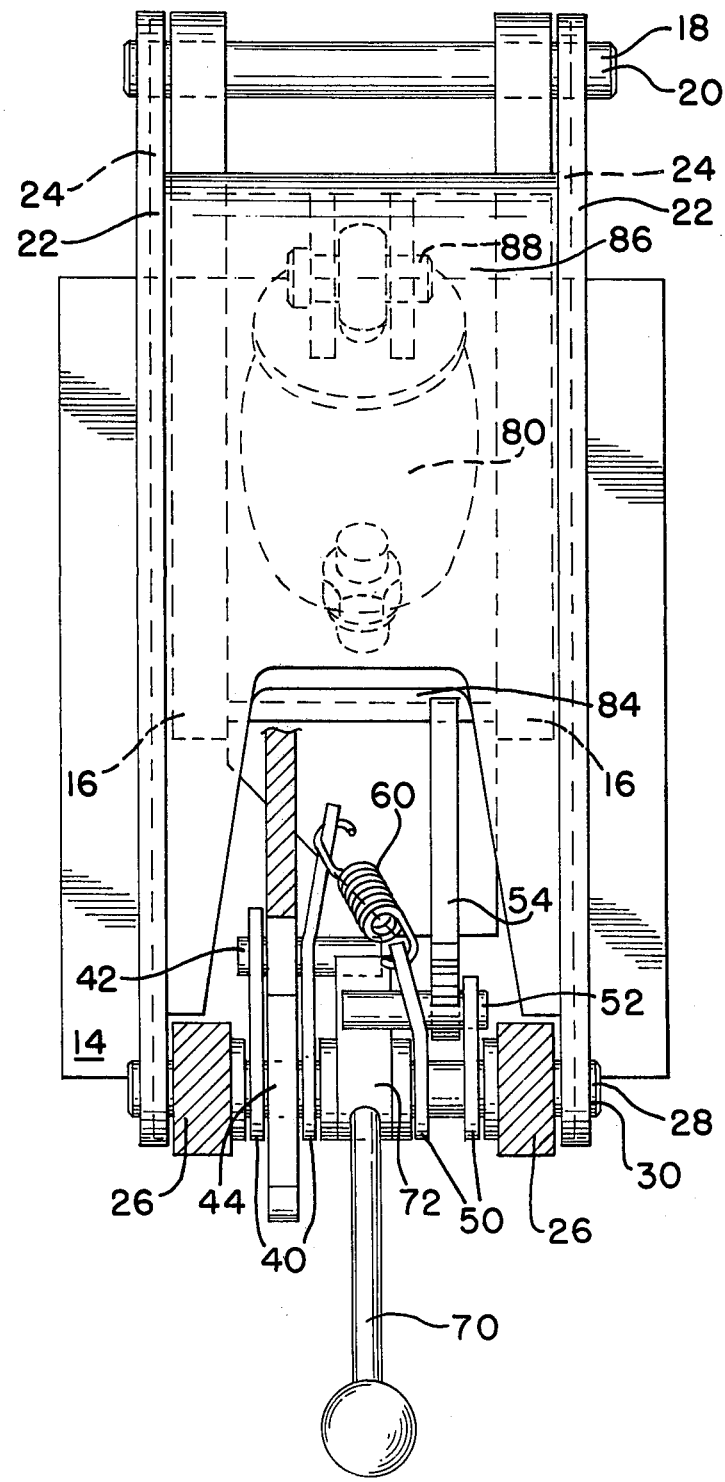
FIG. 4 is an enlarged sectional view taken along the line IV—IV of FIG. 1.

Referring to FIG. 1, a vehicle seat incorporating the principles of this invention is shown at 10. The seat is adapted to be mounted on a fixed frame 12 of a vehicle, not shown, such as an off-highway earth-moving machine or the like.

The vehicle seat 10 includes a base 14 having a pair of brackets 16 connected to the base and extending upward therefrom. A parallelogram linkage 17 is pivotally attached to the brackets 16 at pins 18 and 20 and comprises a pair of upper links 22 and a pair of lower links 24. The lower links 24 are oriented substantially parallel to the upper links 22. These links 22, 24 connect the brackets 16 to a pair of swing links 26, with upper links 22 pivotally attached to the swing links 26 at pin 28 and lower links 24 pivotally attached to the swing links 26 at pin 30. The swing links 26 are further pivotally connected to the seat 32 at pivot pin 34. Thus, the structure comprises the bracket 16, the links 22, 24, the swing links 26 which act to allow the seat 32 to move relative to the base 14 either upwardly or downwardly, and the pin 34 rotatably connecting the seat to the swing links 26 and acting as a pivot point to allow the seat 32 to tilt with respect to the base 14.

Referring now particularly to FIG. 2, the assembly for controlling the degree of tilt of the seat 32 with respect to the base 14 includes a pair of links 40 also pivotally attached to the swing links 26 at pin 30. These links 40 further act to maintain a tilt select pin 42 at an attitude substantially parallel along its centerline axis to that of the pin 30. As shown more clearly in FIGS. 1 and 3, the tilt select pin 42 determines a given tilt for the seat 32 by being seated in one of a plurality of notches defined in a tilt position member 44 which is anchored to the bottom of the seat 32. The notches of the tilt position member 44 are positioned such that the seating of the tilt select pin 42 in a given notch creates a different tilt disposition of the seat 32 with respect to the base 14 for each notch.

Referring again to FIG. 2, the assembly for controlling the height of the seat 32 with respect to the base 14 includes a pair of links 50 also pivotally mounted to the swing links 26 at pin 30. These links 50 further act to maintain a height select pin 52 at an attitude substantially parallel along its centerline axis to that of the pin 30. As shown more clearly in FIGS. 1 and 3, the height select pin 52 determines a given height for the seat 32 by being seated in one of a plurality of notches defined in a height position member 54 which is anchored to the base 14. The notches of the height position member 54 are positioned such that the seating of the height select pin 52 in a given notch creates a different level of height of the seat 32 above the base 14 for each notch.

As shown in FIG. 3, to allow the single spring 60 to hold both the tilt select pin 42 and the height select pin 52 in their respective given notches, the notches of the tilt position member 44 opens substantially in a downward direction towards the base 14, and the notches of the height position member 54 open substantially in an upward direction toward the seat 32, whereas the tilt select pin 42 and its corresponding link 40 are positioned beneath the height select pin 52 and its corresponding links 50. Thus, connecting the spring 60 between one of the links 40 and one of the links 50 acts to normally exert a sufficiently high pulling force therebetween to thereby hold the tilt select pin 42 in its given notch and the height select pin 52 in its given notch. The result is that holding by the spring 60 causes both the height and the tilt disposition of the seat 32 with respect to the base 14 to remain fixed.

The means for changing the position of the seat 32 with respect to the base 14 comprise a lever 70 fixed to an actuating bar 72 rotatably mounted on the pin 30 between the links 40 and the links 50. As shown in FIGS. 3 and 4, the actuating bar is shaped so that it sits between the tilt select pin 42 and the height select pin 52.

In operation, when the lever 70 is pulled down, the actuating bar 72 rotates about the pin 30 and is caused to contact the height select pin 52. When sufficient force is applied to the lever 70 to counteract spring 60, the result is that the height select pin 52 is forced out of its present notch in the height position member 54 by the actuating bar 72. This allows, by the means of the swing links 26, the upper links 22 and the lower links 24 pivotally connected thereto as described above, for the positioning of the height select pin 52 over a new notch in the height position member 54, to thus reposition the height of the seat 32 with respect to the base 14. When the lever 70 is released, the height select pin is drawn into the new notch by the spring 60 which thereby also returns the actuating bar 72 and the lever 70 to their original positions, and as a result a new height disposition of the seat 32 becomes fixed.

When the lever 70 is pushed up, the actuating bar 72 rotates about the pin 30 and is caused to contact the tilt select pin 42. When sufficient force is applied to the lever 70 to counteract spring 60, the result is that the tilt select pin 42 is forced out of its present notch in the tilt position member 44 by the actuating bar 72. This allows, by means of the pivot pin 34, for the positioning of the tilt select pin 42 over a new notch on the tilt position member 44 to thus reposition the tilt of the seat 32 with respect to the base 14. When the lever 70 is released, the tilt select pin is drawn into the new notch by the spring 60 which thereby also returns the actuating bar 72 and the lever 70 to their original positions, and as a result the new tilt position of the seat 32 becomes fixed.

The ability of an operator to perform a height or tilt adjustment to the seat 32 is facilitated by means of compression spring 80 and compression spring 82. As shown in FIGS. 1 and 4, compression spring 80 is connected between an arcuate flange 84 formed in the base 14 and a stiffening member 86 connected between the two upper links 22. The spring 80 is rotatably attached to the stiffening member 86 by means of a pin 88. In operation, the spring 80 increases its resistance to motion as the seat 32 is lowered. This is because the upper links 22, since they are part of the means for allowing the raising and lowering of the seat 32 as described above, draws closer to the base 14 in conjunction with the seat 32 as it gets lower. This movement thus tends to increase the compression of the spring 80 as the upper links 22 approach the base 14 and thereby increasing the resistance felt by the operator to further lowering of the seat 32. As a result, an operator can control the extent of lowering of the seat 32, i.e. its height, merely by varying the weight he exerts on the seat itself.

Similarly, in adjusting the tilt of the seat 32, compression spring 82 serves the same function as spring 80. As shown in FIG. 1, spring 82 is connected between the seat 32 and the swing links 26. The spring 82 is rotatably attached to a flange 90 extending out from the swing links 26, as shown in FIG. 2, by means of a pin 92. The other end of the spring 82 is attached to the seat 32 by means of a flange 94. In operation, the spring 82 increases its resistance to motion as the degree of tilt of the seat 32 with respect to the base 14 is increased. This is because the seat 32 tilts about the pivot point 34, as described above, which is also a connecting point of the swing links 26 to the seat 32. Thus, as tilt increases with respect to the base, the flange 94 connected to the seat 32 draws closer to the swing links 26, and as a result compresses the spring 82 lying therebetween. This spring 82 compression tends to increase as the seat 32 tilt increases thereby increasing the resistance felt by the operator to greater tilting of the seat 32. As a result, again an operator can control the extent of seat 32 tilt with respect to the base 14 merely by varying the weight he exerts on the seat itself.

The present embodiment of this invention is to be considered in all respects as illustrative and not restrictive; the scope of the invention being indicated by the appended claims rather than by the foregoing description, and all changes which come within the meaning and range of equivalency of the claims therefore are intended to be embraced therein.

What is claimed is:

1. A vehicle seat structure comprising:
   a base portion;
   a seat portion;
   first means operatively connecting said seat portion and said base portion for providing that said seat portion may be tilted with respect to said base portion;
   second means operatively connecting said seat portion and said base portion for providing that said seat portion may be raised and lowered with respect to said base portion;
   actuating bar means operatively controlling said first and second means, being movable to a first position to actuate said first means, being movable to a second position to actuate said second means, and being movable to a third position; and
   position control means operatively connected with said actuating bar means comprising means for selectively determining the height disposition of said seat portion while the tilt disposition of said seat portion remains unchanged and means for selectively determining the tilt disposition of said seat portion with the actuating bar means being in said third position.

2. The seat structure of claim 1, wherein the second means comprise swing link means operatively coupled at one end with said seat portion, and base link means pivotally connected at one end to said base portion, and pivotally connected at the other end to said swing link means.

3. The seat structure of claim 2, wherein the first means comprise means for pivotally connecting said seat portion to said swing link means.

4. The seat structure of claim 3 wherein said means for selectively determining the tilt disposition of said seat portion comprises:
   a tilt position member anchored to said seat portion;
   a tilt select pin; and
   first link means pivotally connecting said tilt select pin to said swing link means, wherein said tilt position member defines a plurality of notches thereon for allowing said tilt select pin to be seated within a given one of said notches, and wherein said notches in said tilt position member are positioned such that seating of said tilt select pin in any one of said notches defines a separate tilt disposition for said seat portion.

5. The seat structure of claim 4, wherein said means for selectively determining the height disposition of said seat portion comprise:
   a height position member anchored to said base portion;
   a height select pin; and
   second link means pivotally connecting said height select pin to said swing link means, wherein said height position member defines a plurality of notches thereon for allowing said height select pin to be seated within a given one of said notches, and wherein said notches in said height position member are positioned such that seating of said height select pin in any one of said notches defines a separate height disposition for said seat portion.

6. The seat structure of claim 5, wherein the means for selectively determining the tilt disposition of said seat portion further comprise restraining means for normally holding thereby said tilt select pin within a given one of said notches in said tilt position member.

7. The seat structure of claim 6, wherein the means for selectively determining the height disposition of said seat portion further comprise restraining means for normally holding thereby said height select pin within a given one of said notches in said height position member.

8. The seat structure of claim 7 wherein the said actuating bar means further comprise an actuating bar and a control lever fixed thereon, said actuating bar rotatably mounted on said swing link means such that when the control lever is moved to said first position, the actuating bar contacts said tilt select pin and disengages said tilt select pin from its present given notch, said control lever being operating with sufficient force to counteract said restraining means, to thereby allow the tilt operation of said first means with resultant seating of said tilt select pin in a new selected notch in said tilt position member when said control lever is moved back to said third position.

9. The seat structure of claim 8 wherein said actuating bar means further comprise said actuating bar rotatably mounted on said swing link means such that when the control lever is moved to said second position, the actuating bar contacts said height select pin and disengages said height select pin from its present given notch, said control lever being operated with sufficient force to counteract said restraining means, to thereby allow the height adjusting operation of said second means, with resultant seating of said height select pin in a new selected notch in said height position member when said control lever is moved back to said third position.

10. The seat structure of claim 9 wherein the restraining means comprise spring means operatively connected between said first and second link means for normally holding thereby said height select pin and said tilt select pin within their given currently occupied notches.

11. The seat structure of claim 1 wherein the first means further comprise tilt spring loading means for providing an increasing adjustment resistance as said seat portion tilt is increased, thereby allowing the operator to adjust the tilt of said seat portion merely by shifting his weight in the seat.

12. The seat structure of claim 1 wherein the second means further comprise height spring loading means for providing an increasing adjustment resistance as said seat portion height is decreased, thereby allowing the operator to adjust said seat portion height merely by shifting his weight in the seat.

13. The seat structure of claim 2 wherein the base link means comprise parallelogram linkage means pivotally connected between said base portion and said swing link means, said parallelogram linkage means comprising an upper link having an end pivotally attached to said swing link means and an opposite end pivotally attached to said base portion, and a lower link disposed in a space substantially parallel in relation to said upper link and having an end pivotally attached to said swing link means and an opposite end pivotally attached to said base portion to form thereby a parallelogram.

* * * * *